(12) United States Patent
Carlsson et al.

(10) Patent No.: US 9,654,997 B2
(45) Date of Patent: May 16, 2017

(54) METHOD AND SYSTEM FOR EVALUATION OF SENSOR OBSERVATIONS

(75) Inventors: Richard Carlsson, Stockholm (SE); Julien Forgeat, Beijing (CN); Vincent Huang, Sollentuna (SE); Qingyan Liu, Beijing (CN); Sky Zhao, Beijing (CN)

(73) Assignee: TELEFONAKTIEBOLAGET LM ERICCSON (PUBL), Stockholm (SE)

( * ) Notice: Subject to any disclaimer, the term of this patent is extended or adjusted under 35 U.S.C. 154(b) by 48 days.

(21) Appl. No.: 14/354,256

(22) PCT Filed: Oct. 28, 2011

(86) PCT No.: PCT/CN2011/081491
§ 371 (c)(1),
(2), (4) Date: Apr. 25, 2014

(87) PCT Pub. No.: WO2013/060018
PCT Pub. Date: May 2, 2013

(65) Prior Publication Data
US 2014/0301276 A1    Oct. 9, 2014

(51) Int. Cl.
*H04W 24/10* (2009.01)
*H04L 12/26* (2006.01)
*H04L 29/08* (2006.01)

(52) U.S. Cl.
CPC ............ *H04W 24/10* (2013.01); *H04L 12/26* (2013.01); *H04L 67/12* (2013.01)

(58) Field of Classification Search
None
See application file for complete search history.

(56) References Cited

U.S. PATENT DOCUMENTS

| 5,848,383 A | 12/1998 | Yunus | |
| 7,292,956 B1 * | 11/2007 | Guday | G06F 19/3487 702/118 |

(Continued)

FOREIGN PATENT DOCUMENTS

| CN | 101689287 A | 3/2010 |
| CN | 102104080 A | 6/2011 |
| WO | 2009005963 A1 | 1/2009 |

OTHER PUBLICATIONS

Extended European Search Report issued in corresponding application No. EP 11874638, dated Jun. 3, 2015, 6 pages.

(Continued)

*Primary Examiner* — Donald Mills
(74) *Attorney, Agent, or Firm* — Rothwell, Figg, Ernst & Manbeck, P.C.

(57) ABSTRACT

Method and sensor observation system (200), for reporting observations to data users (204) based on sensor data collected (2:1) from a network of sensors (202). A first observation report that originates from a sensor in the network, is provided (2:4) to a first data user and a rating with respect to quality of the first observation report is received (2:5) from the first data user. Rating information is then created (2:8) based on the received rating, and a second observation report originating from the same sensor and comprising said rating information is provided (2:10) to a second data user. The comprised rating information thus indicates reliability of the second observation report. Thereby, the second data user is enabled to estimate and use the second observation report depending on its reliability as indicated by the rating information.

20 Claims, 3 Drawing Sheets

(56) References Cited

U.S. PATENT DOCUMENTS

| | | | | |
|---|---|---|---|---|
| 7,519,562 B1* | 4/2009 | Vander Mey | ............ | G06Q 30/02 |
| | | | | 705/12 |
| 8,032,334 B2* | 10/2011 | Bieswanger | ............ | G06F 11/30 |
| | | | | 700/74 |
| 8,587,630 B1* | 11/2013 | Krinsky | ............ | H04N 7/14 |
| | | | | 348/14.01 |
| 2001/0013009 A1* | 8/2001 | Greening | ............ | G06Q 10/063112 |
| | | | | 705/7.14 |
| 2002/0072329 A1* | 6/2002 | Bandeira | ............ | H04B 7/2609 |
| | | | | 455/7 |
| 2007/0080799 A1* | 4/2007 | Werenka | ............ | G08B 25/009 |
| | | | | 340/506 |
| 2007/0232878 A1 | 10/2007 | Kovatchev et al. | | |
| 2008/0126533 A1* | 5/2008 | Klein | ............ | G06K 9/00624 |
| | | | | 709/224 |
| 2008/0129518 A1 | 6/2008 | Carlton-Foss | | |
| 2009/0002148 A1* | 1/2009 | Horvitz | ............ | G06Q 10/047 |
| | | | | 340/514 |
| 2009/0204348 A1* | 8/2009 | Davis | ............ | H04W 4/02 |
| | | | | 702/60 |
| 2013/0057384 A1* | 3/2013 | Morris | ............ | H04L 67/1095 |
| | | | | 340/5.74 |

OTHER PUBLICATIONS

Chinese Office Action issued in Chinese Application No. 201180074511.2, dated Aug. 2, 2016, 4 pages.

* cited by examiner

METHOD AND SYSTEM FOR EVALUATION OF SENSOR OBSERVATIONS

CROSS REFERENCE TO RELATED APPLICATION(S)

This application is a 35 U.S.C. §371 National Phase Entry Application from PCT/CN2011/081491, filed Oct. 28, 2011, designating the United States, the disclosure of which is incorporated herein in its entirety by reference.

TECHNICAL FIELD

The present disclosure relates generally to a method and a sensor observation system for enabling evaluation and estimation of sensors and observations made by the sensors e.g. regarding measurements of environment properties.

BACKGROUND

Different types of sensors are commonly used today for automatically monitoring conditions in certain environments. The sensors may be adapted and used for measuring various properties such as temperature, pressure, humidity, noise level, oxygen level, traffic density, and so forth. The environments monitored by sensors in this way may include any indoor or outdoor locations of any size, such as limited rooms requiring controlled conditions or more open spaces and locations of interest, as well as particular "objects" such as machines or humans. Some examples of sensors are temperature sensors used for controlling ventilation systems in a building, oxygen level sensors used for controlling agriculture conditions, and humidity sensors used for weather observations.

It is also useful to employ a common network with multiple sensors to serve a range of different users having different objectives and methods for making use of the measurements and observations delivered by the sensors. Such sensor networks may therefore become quite large and complex, e.g. including several different types of sensors installed at different locations, as well as communication links, gateways and servers for collecting and conveying observation results from the sensors to appropriate receiving parties.

The end-receivers or "consumers" of such measurement results from sensors may include any humans, automatic applications, control and monitoring systems, that have requested for or subscribe to the sensor information, in the following referred to as "data users" for simplicity which could be any parties without limitation to the described examples. Further, any measurements and registrations that can be made by such sensors in this context will be referred to as "observations" without limitation to the described examples.

FIG. 1 illustrates schematically how a network of sensors 100 is used to provide observations to data users according to regular procedures. A first action 1:1 shows that sensor data from the sensors 100 is received and stored in a data collector entity 102 which is typically a server or the like including equipment for communication, processing and data storage. In this example, the data collector 102 performs some kind of analysis and processing of the received sensor data, in an action 1:2, in order to create and compile different reports of the sensor observations for different data users.

Further, a number of interfaces 102a, in this example Application Programming Interfaces, APIs, are configured in the data collector 102 to deliver the observation reports individually to various data users 104, as schematically shown by an action 1:3. The data users 104 in this example include a website e.g. for publishing weather forecasts, a control application e.g. for monitoring and controlling some apparatus or process depending on the measurements, and an information centre e.g. providing information and predictions on the road traffic situation.

Typically, the data users are not aware of what type of sensors are used for their reports, how they measure, and how/where they are set up in detail. Basically, the data user's main interest is that the resulting information is delivered from the APIs 102a and also that it is accurate and can be trusted. However, some sensors may provide incorrect data resulting in reports that inaccurately reflect the environment being measured or otherwise observed. This inaccuracy may be caused by malfunctioning hardware or software in the sensors, and/or faults in the components and network used for distribution of the sensor data.

It is therefore a problem that data users are not able to estimate whether a received report is reliable or not. Sometimes the data users may get conflicting information from different sensors, not knowing which information can be trusted. There are various methods and arrangements available for discovering faults in the sensor and distribution equipment, such as discovering that one of several sensors at the same location provides a measurement that deviates from the others. Measurement results from one or more sensors may also be analyzed in a more or less sophisticated manner, e.g. over time, to detect any abnormal or strange behaviour. The suspected faulty sensor may then be visited on location for further investigation. For example, a temperature sensor that suddenly reports an unexpected temperature can be inspected by going out with a thermometer to measure the correct temperature manually at the sensor location.

However, a faulty sensor may nonetheless go unnoticed and will thus continue to provide erroneous measurements and observations without being discovered. The above methods further require a certain amount of efforts and extra equipment and are executed mainly to recognize and exchange faulty equipment, while it is still a problem that data users have no way of knowing whether a delivered measurement report can be trusted or not.

SUMMARY

It is an object of the invention to address at least some of the problems and issues outlined above. It is possible to achieve these objects and others by using a method and an apparatus as defined in the attached independent claims.

According to one aspect, a method is provided in a sensor observation system for reporting observations to data users, which observations originate from sensor data collected from a network of sensors. In this method, a first observation report originating from a sensor in the network is provided by the sensor observation system to a first data user. The term "sensor" may in this context represent one or more physical sensors. The sensor observation system then receives a rating of the first observation report with respect to quality from the first data user. Rating information pertaining to reliability of the sensor, is created based on the rating received from the first data user. Optionally, the rating information may be further based on other ratings made for observation reports originating from the same sensor. The sensor observation system also provides a second observation report originating from the same sensor to a second data user, where the second observation report comprises the above rating information to indicate reliability of the second observation report. Thereby, the second data user is able to estimate whether the received observation report can be trusted or not, which fact can further be utilized for using or discarding the report.

According to another aspect, a sensor observation system is provided which is configured to report observations to data users, where the observations originate from sensor data reported from a network of sensors. The sensor observation system comprises an observation unit adapted to collect the sensor data from the network of sensors, and a presentation unit adapted to provide a first observation report originating from a sensor in the network to a first data user. The sensor observation system also comprises a rating unit adapted to receive a rating of the first observation report with respect to quality from the first data user, and to create rating information pertaining to reliability of the sensor based on the rating received from the first data user. The presentation unit is further adapted to provide a second observation report originating from the same sensor to a second data user, the second observation report comprising the above rating information to indicate reliability of the second observation report.

The above method and apparatus may be configured and implemented according to different optional embodiments. In one possible embodiment, the second observation report may refer to the same observation as the first observation report or to a subsequent observation made by the same sensor. The rating information may refer to an aggregated rating of multiple ratings of observation reports on the same observation. If the second observation report refers to a different observation than the first observation report, the rating information may refer to an aggregated rating of multiple ratings of previous observation reports on different observations made by the sensor. In that case, the aggregated rating may be updated whenever a rating of an observation report originating from the sensor is received.

In further possible embodiments, the collected sensor data may be logged as observations linked to stored sensor information. In that case, the observations may be tagged with any of: measured property, measured value, measured medium, the above sensor information, and time of observation. Further, ratings received from data users may be logged with reference to corresponding observations, or be otherwise linked thereto in a suitable manner. The ratings may also be tagged with relevant user information.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
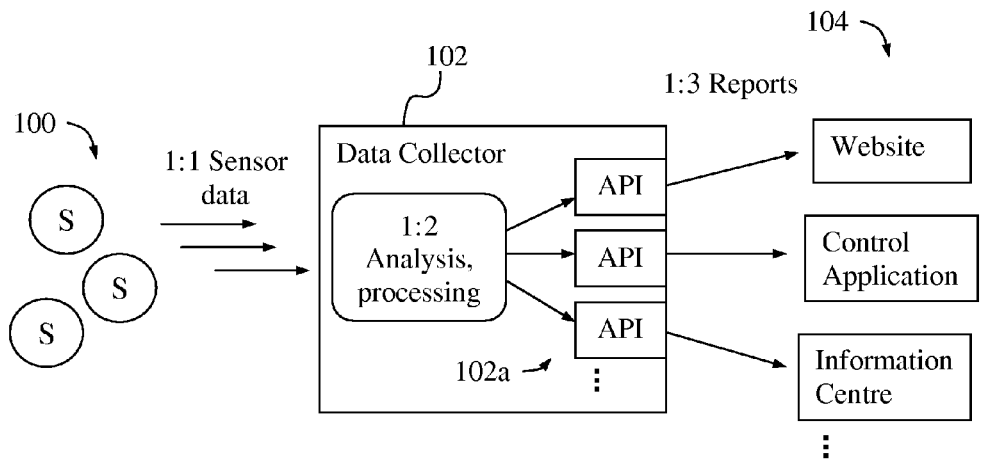
FIG. 1 is a communication scenario illustrating how sensors are used for reporting observations, according to the prior art.

Briefly described, a solution is provided in a sensor observation system to enable data users to estimate received observation reports, originating from observations from a network of sensors, e.g. with respect to reliability and usefulness. When an observation report originating from a sensor is delivered to a data user, the user can in this solution return a rating with respect to quality of the received observation report.

For example, the data user may notice that the observation report is strange and obviously erroneous, and thus returns a quite low rating to indicate low quality of the delivered observation report. On the other hand, an observation report that the user can verify as correct and accurate will cause the user to return a rather high rating indicating high quality of the delivered observation report, and so forth. When another observation report originating from the same sensor is delivered to another data user, the previously received rating may be included as rating information in the latter report to indicate reliability and usefulness of the reported observation. The observation of this report may be the same observation as in the former report or another observation made by the same sensor.

An example of how the solution can be put into practice in a sensor observation system, will now be described with reference to the communication scenario depicted in FIG. 2 which illustrates a flow of information and actions for handling multiple observations and reports on a continuous basis. Further examples to be outlined later in this description are directed rather to how individual observations and reports are handled. The sensor observation system 200 is schematically illustrated in this example to contain various data handling functions which can be implemented by a suitable arrangement of processing circuits and storage entities, to be exemplified in more detail later in this description.

The sensor observation system 200 comprises an observation storage entity 200a for collecting sensor data, denoted as observation data, from a network of sensors 202, as shown by an action 2:1. This is basically a more or less continuously ongoing process depending on the configuration of the sensors 202 which may, to mention a few non-limiting examples, be configured to measure and report various environment properties such as temperature, pressure, humidity, noise level, oxygen level, traffic density, and so forth. The collection of sensor data in entity 200a can be performed according to any conventional procedures, which is not necessary to describe here in detail to understand the solution.

In this example, information on the sensors 202 is further maintained in a sensor storage entity 200b of the sensor observation system 200, which information may refer to type of sensor, location, date of installation, various features and characteristics of the sensors, etc. The collected observations in entity 200a may be tagged with corresponding sensor information from sensor storage entity 200b, as shown by an action 2:2. Consequently, each observation logged in observation storage entity 200a can be associated to the sensor having performed and supplied the logged observation.

The collected observations, or at least some of them, are transferred to a presentation server 200c, shown by an action 2:3, which is configured to provide observation reports to data users 204, e.g. after processing, analyzing and compiling the observations received from entity 200a in order to deliver different reports of the sensor observations for different data users. For example, the presentation server 200c may comprise a set of APIs or the like configured to deliver different observation reports individually to different data users. Some processing of the raw observation data may also be performed by the observation storage entity 200a, and the solution is not limited in this respect.

A further action 2:4 illustrates that presentation server 200c delivers appropriate observation reports to data users 204, e.g. upon request or according to subscription. A next action 2:5 illustrates that some of the data users 204 return ratings of delivered observation reports along with a report identity or mark of the referred report, the ratings indicating quality of respective observation reports, as explained and exemplified above. The returned ratings are received and maintained in a rating storage entity 200d of the sensor observation system 200. The ratings may be registered as numeric values according to some predefined rating scale, e.g. in the range of 0-1 or 0-10. Alternatively, the ratings may be registered as different classes such as "good", or "bad", and so forth. In either case, the ratings can be used as a relative measure of perceived quality of the reports. The ratings from the data users are also marked with an indication of which observation report they refer to, e.g. the above-mentioned report identity or mark in the delivered observation reports.

A further action 2:6 illustrates that the received ratings are linked to the observations maintained in the observation storage entity 200a, such that each received rating is associated to a sensor having performed and supplied the rated observation, which may be accomplished by pointers or by copying corresponding data from one storage entity to the other. Further, each received rating may optionally also be tagged with information on the data user having provided the rating, which can be retrieved from a storage 200e of user information, as shown by an action 2:7. Thereby, it is possible to gather and analyze multiple ratings made by the same data user to detect a specific behaviour or attitude of that user, e.g. whether the user is mostly positive or negative to received observation reports, or whether the user typically provides ratings under certain circumstances or conditions, and so forth. This information on user behaviour or attitude may then be considered and used when creating rating information pertaining to reliability of the sensors, based on ratings received from different data users, to be described further below.

Another action 2:8 illustrates that rating information pertaining to reliability of the sensors is created based on the received ratings. This rating information is to be included in further observation reports originating from corresponding sensors. For example, a rating of a delivered observation report originating from a certain sensor may be included as the rating information in a subsequent observation report originating from the same sensor but delivered to another data user. In another example, the rating information in an observation report originating from a sensor may refer to an aggregated rating of multiple ratings of previous observation reports originating from the same sensor, e.g. a mean value of all received ratings referring to one or more observations by that sensor.

It should be noted that reports of the same observation may be delivered to multiple data users. Hence, multiple ratings may be returned pertaining to the same observation, or to several observations made by the same sensor. As indicated above, information on the users having returned ratings may also be considered when creating the rating information, such that ratings returned from one data user may be deemed more valid that those returned from another data user, based on corresponding user information. To that end, the returned ratings may be tagged with user information, as of action 2:7, e.g. in order to give different weight to different ratings when creating the rating information for forthcoming observation reports.

In any case, the rating information is supplied from rating storage entity 200d to the presentation server 200c, in an action 2:9, to be included in observation reports together with the observations supplied from observation storage entity 200a. In more detail, the presentation server 200c creates further observation reports for specific data users that include both the observations themselves and the rating information pertaining to reliability of the sensors having made the reported observations, to thereby indicate reliability of the observation reports.

A final shown action 2:10 illustrates that presentation server 200c delivers observation reports with related rating information to various data users 204. Thereby, the data users are able to estimate the received observation reports, e.g. with respect to reliability and usefulness, based on the ratings made for previous observation reports originating from corresponding sensors.

After having used a particular sensor for some time in this process, the ratings indicating reliability of that sensor at various observations may be accumulated in entity 200d such that the basis for creating rating information will be increasingly large. Initially, when no ratings have been received yet for a newly installed sensor, a preliminary rating may be included as rating information in the initial observation reports originating from that sensor, until one or more ratings have been returned and can be used as a basis for creating rating information. The preliminary rating of the sensor may be determined based on previous use of the sensor or of the same type of sensor, which is however outside the scope of this solution.

If consistently low ratings referring to observations by a particular sensor are returned, it may be used as a trigger to check the performance of that sensor and/or of the data transport therefrom, e.g. for repair or replacement of faulty components, or for reconfiguring the sensor network, and so forth. In this way, the sensors 202 are effectively monitored and surveyed by the data users in a continuous and automatic fashion from the sensor owner's perspective. The returned ratings can thus be used both to enrich the observation reports and to monitor and supervise the sensor network.

Figure 2:
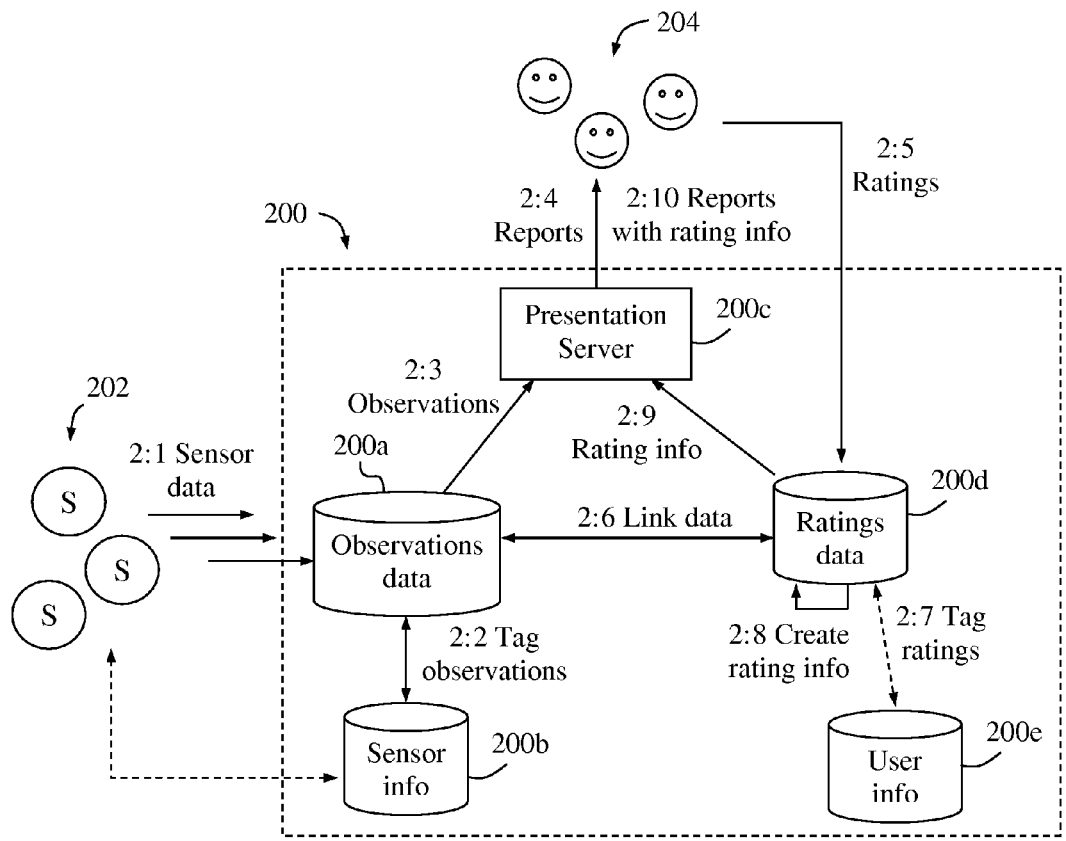
FIG. 2 is a communication scenario illustrating a procedure and a sensor observation system for reporting observations to data users, according to some possible embodiments.
Figure 2A:
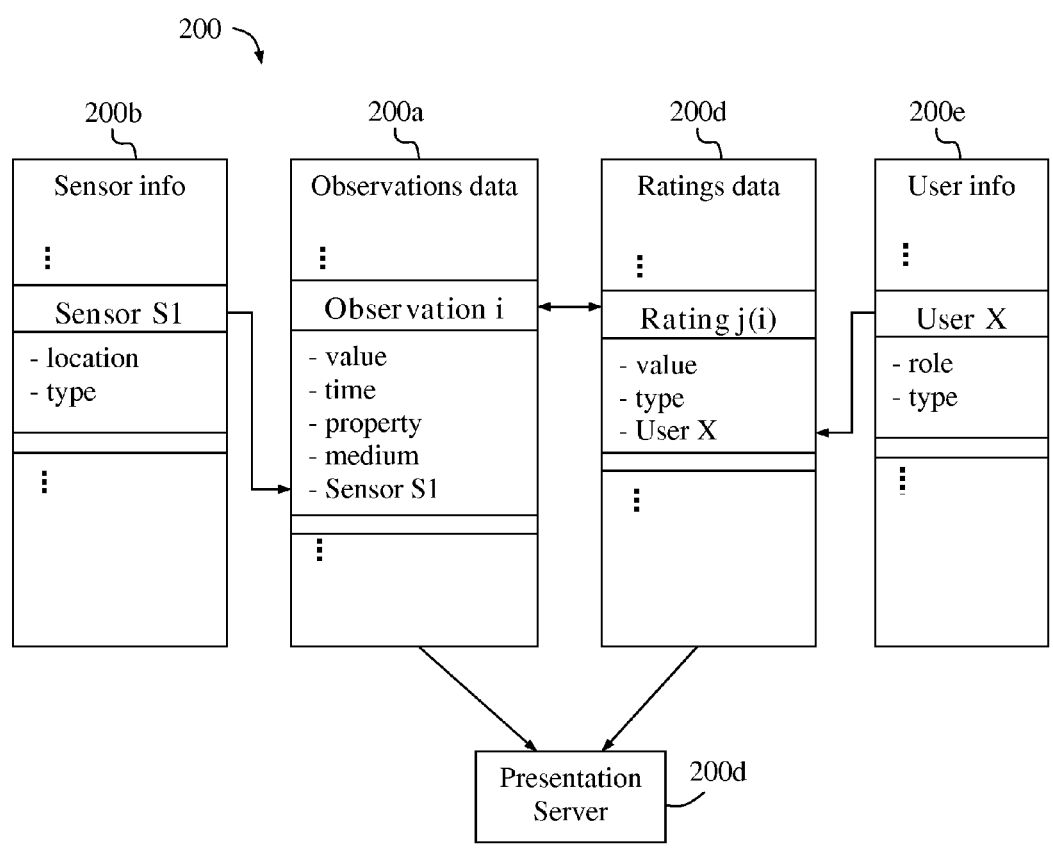
FIG. 2a is a schematic diagram illustrating an example of how data can be maintained in the sensor observation system of FIG. 2, according to further possible embodiments.

FIG. 2a illustrates schematically an example of how the information in the storage entities 200a, b, d and e of FIG. 2 may relate to one another. In the above action 2.1, observation storage entity 200a thus collects and logs observation data from the sensor network 202, and a logged observation denoted "i" in this example has been made by a sensor with an identity "S1". The logged data for observation i comprises a measured value, the time of observation, a property that was measured, e.g. temperature, pressure, etc., and a "medium" that was measured, e.g. air, water, soil, etc. However, these are optional examples and one or more of the above data may be omitted or other types of data may be added, without limitation to this solution.

The observation i is also tagged with the sensor identity S1 which may act as a pointer to the sensor storage entity 200b which holds information on sensor S1 such as location and type of sensor. Further possible sensor information in entity 200b may include date of installation, date of manufacture, and various features and characteristics of the sensor. By tagging logged observations of a sensor with a sensor identity, an aggregated rating can be easily determined for that sensor.

The ratings storage entity 200d logs data of ratings returned from data users 204, as of action 2:5 above, and a logged rating denoted "j(i)" in this example has been returned from a user "X" as valid for a report on observation i. The logged data of rating j(i) comprises a rating value, e.g. a numeric value according to some predefined rating scheme, as exemplified above, and what type of observation has been rated. The latter information can be derived from the entry for observation i in the observation storage entity 200a which can be indicated by a suitable pointer to observation i in entity 200a. The logged data of rating j(i) also comprises an identification of the user X having made the rating j(i), e.g. in the form of a pointer to an entry for user X in the user information storage 200e. The latter entry may comprise various information and characteristics of the user X, such as a "role" indicating why and how the user uses delivered observation reports, and a "type" of user such as private, enterprise, corporation, etc.

As described above, the data logged for rating j(i) is used as a basis for creating rating information to be included in further observation reports originating from the sensor S1. It should be noted that the above examples are mentioned to facilitate understanding of the solution which is thus not limited to these particular examples.

Figure 3:
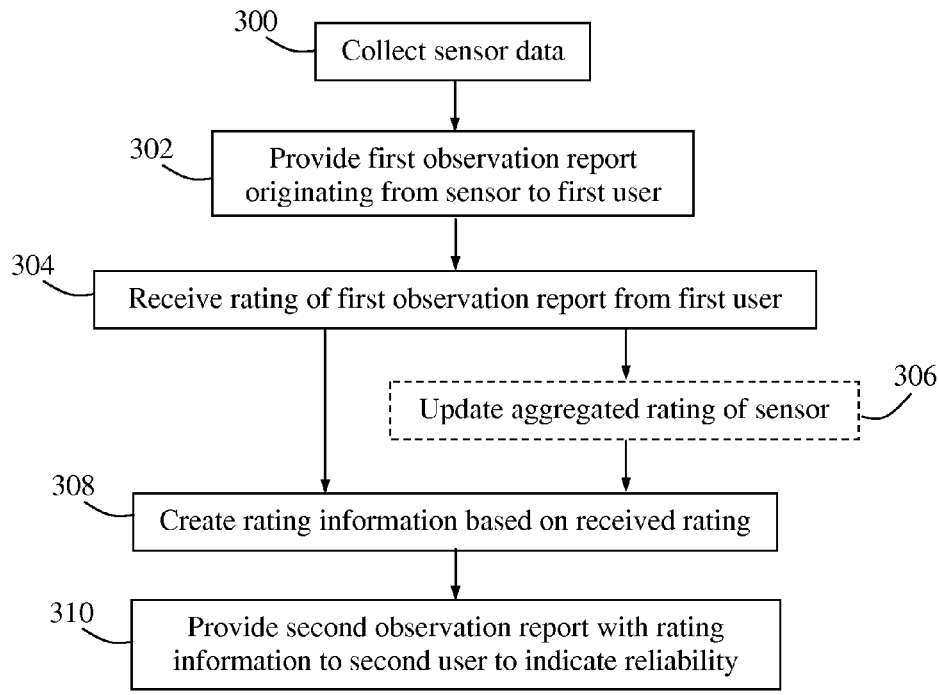
FIG. 3 is a flow chart illustrating a procedure in a sensor observation system, according to further possible embodiments.

A procedure in a sensor observation system for reporting observations to data users, will now be described with reference to the flow chart in FIG. 3, illustrating actions executed in the sensor observation system. It is assumed that the observations originate from sensor data collected from a network of sensors, such as the sensor network 202 in FIG. 2. The procedure illustrated in FIG. 3 is thus directed to how individual observations and reports are handled, and the sensor observation system 200 described for FIG. 2 may also be used in the procedure of FIG. 3.

A first action 300 illustrates that sensor data is collected in the sensor observation system, basically corresponding to action 2:1 above. This action 300 may be performed on a continuous basis in the background as the sensors are configured to perform and report measurements to the sensor observation system. In a further action 302, the sensor observation system provides a first observation report originating from a sensor in the network to a first data user, basically corresponding to action 2:4 above, which may be triggered by a request from the user or by a subscription for observation reports to the data user. Throughout this description, the term "a sensor" is not limited to just one single sensor but should rather be understood to represent one or more sensors. Thus, any of the observation reports mentioned in this description may originate from at least one sensor.

After delivering the first observation report to the first data user, the sensor observation system receives a rating of the first observation report with respect to quality from the first data user, in a following action 304, basically corresponding to action 2:5 above. The rating returned from the user in this solution may be specified in any suitable manner, without limitation. In a practical example, the user may provide a rating to the sensor observation system by means of the well-known "hReview" microformat, which is basically a document template that the data user can use to make the rating presentation semantic. The hReview" microformat may be accessed from a web page and returned as a rating of an observation report in this solution.

An optional action 306 illustrates that an aggregated rating of that sensor, which is representative for multiple previously received ratings of observation reports originating from that sensor, may be updated by the rating received in action 304. In another action 308, the sensor observation system further creates rating information pertaining to reliability of the sensor, based on the rating received from the first data user, basically corresponding to action 2:8 above. According to some possible and optional features, the created rating information may refer to an aggregated rating of multiple ratings of previous observation reports on the same observation, or to an aggregated rating of multiple ratings of previous observation reports on different observations made by the same sensor which may have been updated in action 306 by the rating received in action 304.

In a further action 310, the sensor observation system provides a second observation report originating from the same sensor to a second data user, basically corresponding to action 2:10 above. The second observation report comprises the above created rating information to indicate reliability of the second observation report. The second observation report may refer to the same observation as the first observation report, or to a different observation than the first observation report.

Figure 4:
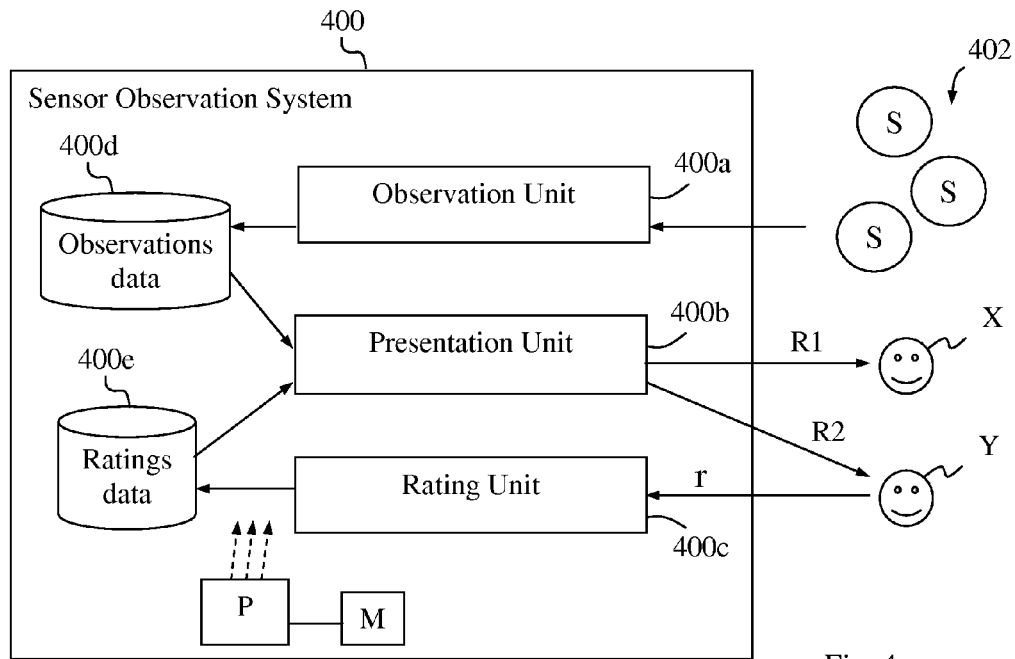
FIG. 4 is a block diagram illustrating a sensor observation system in more detail, according to further possible embodiments.

A detailed but non-limiting example of how a sensor observation system can be configured to accomplish the above-described solution, is illustrated by the block diagram in FIG. 4. The sensor observation system 400 is configured to report observations to data users, which observations originate from sensor data reported from a network of sensors 402, e.g. according to the procedures described above for FIGS. 2 and 3, respectively.

The sensor observation system 400 comprises an observation unit 400a adapted to collect the sensor data from the network of sensors 402, which may be stored in an observations data storage 400d or the like. Basically, the functionalities of the observation unit 400a and the observations data storage 400d correspond to the functionality of the observation storage entity 200a described for FIG. 2.

The sensor observation system 400 further comprises a presentation unit 400b adapted to provide a first observation report "R1" originating from a sensor in the network 402 to a first data user "X". Basically, the functionality of the presentation unit 400b corresponds to the functionality of the presentation server 200c described for FIG. 2.

The sensor observation system 400 also comprises a rating unit 400c adapted to receive a rating "r" of the first observation report with respect to quality from the first data user X, and to create rating information pertaining to reliability of the sensor based on the rating received from the first data user. The received rating "r" may be stored in a ratings data storage 400e or the like. Basically, the functionalities of the rating unit 400c and the ratings data storage 400e correspond to the functionality of the rating storage entity 200d described for FIG. 2. The presentation unit 400b is further adapted to provide a second observation report "R2" originating from the same sensor to a second data user "Y", the second observation report comprising the above created rating information to indicate reliability of the second observation report R2.

It should be noted that FIG. 4 merely illustrates various functional units or entities in the sensor observation system 400 in a logical sense, although the skilled person is able to implement these functions in practice using suitable software and hardware means. Thus, this aspect of the solution is generally not limited to the shown structures of the sensor observation system 400, and the functional units 400a-c may be configured to operate according to the features described above for any of FIGS. 2 and 3, where appropriate.

The functional units 400a-c described above can be implemented in the sensor observation system 400 by means of program modules of a respective computer program comprising code means which, when run by a processor "P" causes the sensor observation system to perform the above-described actions. The processor P may be a single Central Processing Unit (CPU), or could comprise two or more processing units. For example, the processor P may include general purpose microprocessors, instruction set processors and/or related chips sets and/or special purpose microprocessors such as Application Specific Integrated Circuits (ASICs). The processor P may also comprise a storage for caching purposes.

Each computer program may be carried by a computer program product in the sensor observation system 400 in the form of a memory "M" connected to the processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the sensor observation system 400.

The above sensor observation system 400 and its functional units 400a-c may be configured or adapted to operate according to various optional embodiments. In one possible embodiment, if the rating information refers to an aggregated rating of multiple ratings of previous observation reports on different observations made by the same sensor, the rating unit 400c may be further adapted to update the aggregated rating whenever a rating of an observation report originating from that sensor is received.

In further possible embodiments, the observation unit 400a may be further adapted to log the collected sensor data as observations linked to stored sensor information. The observation unit 400a may also be adapted to tag the observations with any of: measured property, measured value, measured medium, the above sensor information, and time of observation. In further possible embodiments, the rating unit 400c may be further adapted to log ratings received from data users with reference to corresponding observations. The rating unit 400c may also be adapted to tag the ratings with user information.

When using the solution described above, e.g. according to any of the proposed embodiments above, data users are able to estimate whether a delivered measurement report can be trusted or not. In this way, a faulty sensor can also easily be discovered at an early stage and be replaced or repaired to avoid further erroneous measurements and observations from the faulty sensor. Furthermore, any dedicated efforts and equipment previously used to detect and identify faulty equipment in need of repair or replacement, will not be necessary when using this solution.

While the solution has been described with reference to specific exemplary embodiments, the description is generally only intended to illustrate the inventive concept and should not be taken as limiting the scope of the solution. For example, the terms "observation", "sensor", "sensor observation system", and "rating" have been used throughout this description, although any other corresponding nodes, functions, and/or parameters could also be used having the features and characteristics described here. The solution is defined by the appended claims.

The invention claimed is:

1. A method in a sensor observation system for reporting observations to data users, said observations originating from data collected from a network of sensors, the method comprising:
storing sensor information that describes sensors in the network of sensors;
storing user information that describes the data users;
receiving and storing observation data of an observation from one of the sensors in the network of sensors;
tagging the stored observation data with stored sensor information that corresponds to the sensor;
providing a first observation report of the observation data originating from the sensor to a first data user of the data users;
receiving a rating of the first observation report with respect to quality of the report from the first data user;
linking the received rating from the first data user with the stored observation data from the sensor;
tagging the received rating with stored user information corresponding to the first data user;
creating rating information pertaining to reliability of said sensor, based on the rating received from the first data user;
providing a second observation report of any observation data originating from said sensor to a second data user, the second observation report comprising said rating information to indicate reliability of the second observation report; and
monitoring the sensor observation system by triggering a check of one of the sensors in the network of sensors based on said rating information.

2. The method according to claim 1, wherein the second observation report refers to the same observation as the first observation report.

3. The method according to claim 2, wherein said rating information refers to an aggregated rating of multiple ratings of observation reports on said same observation.

4. The method according to claim 1, wherein the second observation report refers to a different observation than the first observation report.

5. The method according to claim 4, wherein said rating information refers to an aggregated rating of multiple ratings of previous observation reports on different observations made by said sensor.

6. The method according to claim 5, wherein said aggregated rating is updated whenever a rating of an observation report originating from said sensor is received.

7. The method according to claim 1, wherein the collected sensor data is logged as observations linked to stored sensor information.

8. The method according to claim 7, wherein the observations are tagged with any of: measured property, measured value, measured medium, and time of observation.

9. The method of claim 1, wherein creating the rating information comprises generating a mean value of all received ratings of any observation from the sensor.

10. The method of claim 1, wherein tagging of the received rating with the stored user information comprises using a pointer to the stored user information for the first user.

11. The method of claim 1, wherein the sensor information describes a location or installation date of the sensor.

12. The method of claim 11, wherein the user information describes a role of the data user.

13. A sensor observation system configured to report observations to data users, said observations originating from data reported from a network of sensors, comprising:
   a storage device adapted to store sensor information that describes sensors in the network of sensors, and to store user information that describes the data users;
   an observation unit adapted to collect and store observation data of an observation from one of sensors in the network of sensors and to tag the stored observation data with stored sensor information that corresponds to the sensor;
   a presentation unit adapted to provide a first observation report of the observation data originating from the sensor to a first data user of the data users; and
   a rating unit adapted to receive a rating of the first observation report with respect to quality of the report from the first data user, to link the received rating from the first data user with the stored observation data from the sensor, to tag the received rating with stored user information corresponding to the first data user, and to create rating information pertaining to reliability of said sensor based on the rating received from the first data user,
   wherein the presentation unit is further adapted to provide a second observation report of any observation data originating from said sensor to a second data user, the second observation report comprising said rating information to indicate reliability of the second observation report, and
   wherein the rating unit is further configured to monitor the sensor observation system by triggering a check of one of the sensors in the network of sensors based on said rating information.

14. The sensor observation system according to claim 13, wherein the second observation report refers to the same observation as the first observation report.

15. The sensor observation system according to claim 14, wherein said rating information refers to an aggregated rating of multiple ratings of observation reports on said same observation.

16. The sensor observation system according to claim 13, wherein the second observation report refers to a different observation than the first observation report.

17. The sensor observation system according to claim 16, wherein said rating information refers to an aggregated rating of multiple ratings of previous observation reports on different observations made by said sensor.

18. The sensor observation system according to claim 17, wherein the rating unit is further adapted to update said aggregated rating whenever a rating of an observation report originating from said sensor is received.

19. The sensor observation system according to claim 13, wherein the observation unit is further adapted to log the collected sensor data as observations linked to stored sensor information.

20. The sensor observation system according to claim 19, wherein the observation unit is further adapted to tag the observations with any of:
   measured property, measured value, measured medium, and time of observation.

* * * * *